(12) United States Patent
Ioffe et al.

(10) Patent No.: US 10,989,809 B2
(45) Date of Patent: Apr. 27, 2021

(54) SINGLE SCATTERER TEST USING AMPLITUDE AND A PLURALITY OF RECEIVE ELEMENTS

(71) Applicant: Aptiv Technologies Limited, St. Michael (BB)

(72) Inventors: Alexander Ioffe, Bonn (DE); Konstantin Statnikov, Dusseldorf (DE); Wolfgang Doerr, Wiehl (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/106,486

(22) Filed: Aug. 21, 2018

(65) Prior Publication Data

US 2019/0079180 A1 Mar. 14, 2019

(30) Foreign Application Priority Data

Sep. 12, 2017 (EP) .................................... 17190581

(51) Int. Cl.
 *G01S 13/931* (2020.01)
 *G01S 13/42* (2006.01)
 (Continued)

(52) U.S. Cl.
 CPC ............ *G01S 13/931* (2013.01); *G01S 7/415* (2013.01); *G01S 13/42* (2013.01); *G01S 13/583* (2013.01);
 (Continued)

(58) Field of Classification Search
 CPC .......... G01S 7/295; G01S 7/025; G01S 13/90; G01S 13/24; G01S 13/9011; G01S 13/4418; G01S 13/9023; G01S 7/02
 See application file for complete search history.

(56) References Cited

U.S. PATENT DOCUMENTS 4,527,161 A * 7/1985 Wehner .................... G01S 13/24
  342/152
4,866,448 A * 9/1989 Rocca ................. G01S 13/9011
  342/25 D
(Continued)

FOREIGN PATENT DOCUMENTS

EP  2520946 A1 * 11/2012 ............. G01S 7/415
EP  2 998 761 A1   3/2016
(Continued)

OTHER PUBLICATIONS

"Foreign Office Action", EP Application No. 18165097.9, dated Aug. 28, 2020, 5 pages.
(Continued)

*Primary Examiner* — Bernarr E Gregory
(74) *Attorney, Agent, or Firm* — Colby Nipper PLLC

(57) ABSTRACT

A vehicle-based method of determining the extent to which a target object is a single scatterer, said vehicle including a radar system including a radar transmit element, adapted to send a radar signal towards said target object, and an antenna receive array comprising a plurality M of a receive elements, providing a corresponding plurality of N radar receive channels, and adapted to receive radar signals reflected from said target object, said method comprising: a) transmitting a radar signal from said radar transmit element to said target object; b) receiving the reflected signal of the signal transmitted in step a) from the target object at said plurality of receiver elements; c) for each antenna element or channel, processing the received signal to provide amplitude or power data in the frequency domain; d) with respect to the data in step c), for each receive element/channel, determining the frequency with the maximum amplitude or power; e) determining the degree of variability of the results of step d) with respect to each receive element/channel; f) determining (Continued)

the extent to which the target object is a single scatterer based on the result of step e).

6 Claims, 8 Drawing Sheets

(51) Int. Cl.
    *G01S 7/41*         (2006.01)
    *G01S 13/58*       (2006.01)
    *G01V 8/00*        (2006.01)
    *G01S 13/72*       (2006.01)
    *G01S 13/02*       (2006.01)
    *G01S 13/06*       (2006.01)
    *G01S 13/00*       (2006.01)

(52) U.S. Cl.
    CPC .............. *G01V 8/005* (2013.01); *G01S 7/414* (2013.01); *G01S 13/582* (2013.01); *G01S 13/584* (2013.01); *G01S 13/726* (2013.01); *G01S 2013/0245* (2013.01); *G01S 2013/93271* (2020.01); *G01S 2013/93275* (2020.01)

(56) References Cited

U.S. PATENT DOCUMENTS

| | | | |
|---|---|---|---|
| 5,248,976 A * | 9/1993 | Niho | G01S 13/90 342/25 A |
| 5,270,718 A * | 12/1993 | DiDomizio | G01S 13/4418 342/147 |
| 8,044,846 B1 | 10/2011 | Urkowitz et al. | |
| 8,125,370 B1 * | 2/2012 | Rogers | G01S 7/025 342/25 F |
| 9,310,468 B2 * | 4/2016 | Arage | G01S 7/02 |
| 2005/0057391 A1 * | 3/2005 | Forsley | G01S 13/9023 342/25 A |
| 2010/0045513 A1 * | 2/2010 | Pett | G01S 7/295 342/25 C |
| 2013/0169470 A1 * | 7/2013 | Emery et al. | G01S 7/415 342/91 |
| 2015/0331086 A1 * | 11/2015 | Hassen | G01S 13/582 342/175 |
| 2016/0084941 A1 * | 3/2016 | Arage | G01S 13/931 342/91 |
| 2016/0084943 A1 | 3/2016 | Arage | |
| 2017/0059695 A1 | 3/2017 | Fetterman et al. | |
| 2019/0353780 A1 | 11/2019 | Statnikov | |

FOREIGN PATENT DOCUMENTS

| | | |
|---|---|---|
| EP | 3 144 696 A1 | 3/2017 |
| JP | 2014235085 | 12/2014 |

OTHER PUBLICATIONS

Winkler, "Range Doppler Detection for automotive FMCW Radars", Proceedings of the 4th European Radar Conference, Nov. 2007, 4 pages.

* cited by examiner

SINGLE SCATTERER TEST USING AMPLITUDE AND A PLURALITY OF RECEIVE ELEMENTS

TECHNICAL FIELD OF INVENTION

This invention relates to a vehicle based method of detection and subsequent characterization of objects using radar techniques and in particular determining whether a target object is a single scatterer. It has application in determining a suitable landmark for geographical mapping for the purpose of determining the position of a host vehicle. In particular, it relates to determining whether a potential target object or landmark is a single scatterer or not.

BACKGROUND OF INVENTION

Self-localization, that is determining the precise location of a host vehicle, is one of the most important functions for accurate automated driving or such driver assistance schemes such as collision prevention systems. Current car navigation systems generally use a GPS navigation system to estimate the vehicle position. However, such a GPS navigation system is insufficient for precise self-localization of road vehicles due to effects such as reflections caused by buildings and occlusions of GPS signals from satellites. To overcome this problem, many landmark-based ego localization approaches have been elaborated in the past.

It is known to equip vehicles with radar systems/modules. Such radar systems are able to detect radar reflections (i.e. radar detections) from objects in the vicinity and process the data with respect to said radar reflections. Usually, the information needed for current self-localization and mapping (SLAM) procedure is collected from such (reflection/detection) data provided by the radar modules over multiple consecutive scans to identify for example a fixed landmark. This mapping information is updated over time, and a precise superposition of the individual radar-based maps with the GPS maps is performed. In such a way, for example the geographical position determined by GPS is accurately refined by such local data from radar returns.

Thus, in order to reduce the accumulation of errors introduced by non-precise superposition, landmark-based alignment of those radar images is a preferred solution. In the landmark-based SLAM procedure, a key task is to determine one or more suitable landmarks (i.e. objects) in the environment, i.e. in the vicinity of the vehicle which could serve as suitable and quality positional references (anchors) for precise superposition of the individual maps.

Available landmark determination approaches are based on e.g. signal-to-clutter ratio, point spread function matching, image analysis (e.g. by gradient analysis, or template matching etc.), likelihood ratio test, range bin variance analysis or differential interferogram methodologies. However, those approaches are not intended for the automotive environment. Landmarks have been previously examined by single-scan observations from a certain view-angle. Those approaches are typically not robust enough due to complexity of the automotive environment.

Determining whether an object is a single-scatterer can be helpful in determining whether a landmark is suitable so an aim is to determine the extent to which a scatterer under test (SUT) is a single scatterer (originates from a single scattering center). For example, pulse-Doppler radar signal processing can be used to separate reflected signals into a number of "peaks", which occur in the 2-D spectral domain (called range-Doppler map). This spectral data collected from multiple radar receiver channels is utilized to carry out the here proposed single scatterer test.

Several state-of-the-art techniques are known which can be used to determine whether a target response originates from a single scatterer or not (e.g. the European Patent application EP 16188715). One method to analyze if a target response originates from a single scatterer is to involve a (complex-valued) cross-correlation between the measured radar response with the corresponding so called system-dependent Point Spread Function (PSF). PSF of a radar system describes namely its response to an ideal single-scatterer target. If the correlation coefficient is below a (e.g. predetermined) threshold, then the target is considered to be a non-single scatterer.

The cross-correlation involves computational complexity. Additionally, this method is not very sensitive. The current application relates to an improved method of determining whether a target object identified is a single scatterer.

SUMMARY OF THE INVENTION

It is an object of the invention to overcome these problems. One object is to provide a method to determine the suitability of a landmark as a reference, by determining the extent to which the target object is a single scatterer.

In one aspect is provided a vehicle-based method of determining if a radar back-scatterer return of a target object originates from a single scattering center, said vehicle including a radar system including a radar transmit element, adapted to send a radar signal towards said target object, and an antenna receive array comprising a plurality M of a receive elements, providing a corresponding plurality of N radar receive channels, and adapted to receive radar signals reflected from said target object, said method comprising:

a) transmitting a radar signal from said radar transmit element to said target object;

b) receiving the reflected signal of the signal transmitted in step a) from the target object at said plurality of receiver elements;

c) for each antenna element or channel, processing the received signal to provide amplitude or power data in the frequency domain;

d) with respect to the data in step c), for each receive element/channel, determining the frequency with the maximum amplitude or power;

e) determining the degree of variability of the results of step d) with respect to each receive element/channel;

f) determining if the degree of variability from step e) is above or below a threshold, and determining either that the target object is a single scatterer if the degree of variability is below said threshold or that the target object is a non-single scatterer if the variation is above said threshold.

Step c) may include for each antenna receive channel, processing the data to provide power or amplitude data in relation to frequency bins comprising discrete frequency ranges, and step d) comprises for each antenna/channel, determining the bin with the maximum amplitude or power; and step e) determines the degree of variability in said bins in respect of each for each receive element/channel.

In step c) received signal data may be converted from the base time-domain to a range-Doppler frequency domain.

Step c) may include providing a range-Doppler map in terms of range-Doppler frequency domain for each receive element/channel.

Step c) may include providing power or amplitude data in term of Doppler bins.

Step c) the power or amplitude data may be determined from amplitude spectral information from 1-D or 2-D data in the range-Doppler (frequency) domain.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention is now described by way of example with reference to the accompanying drawings in which.

DETAILED DESCRIPTION

Figure 1:
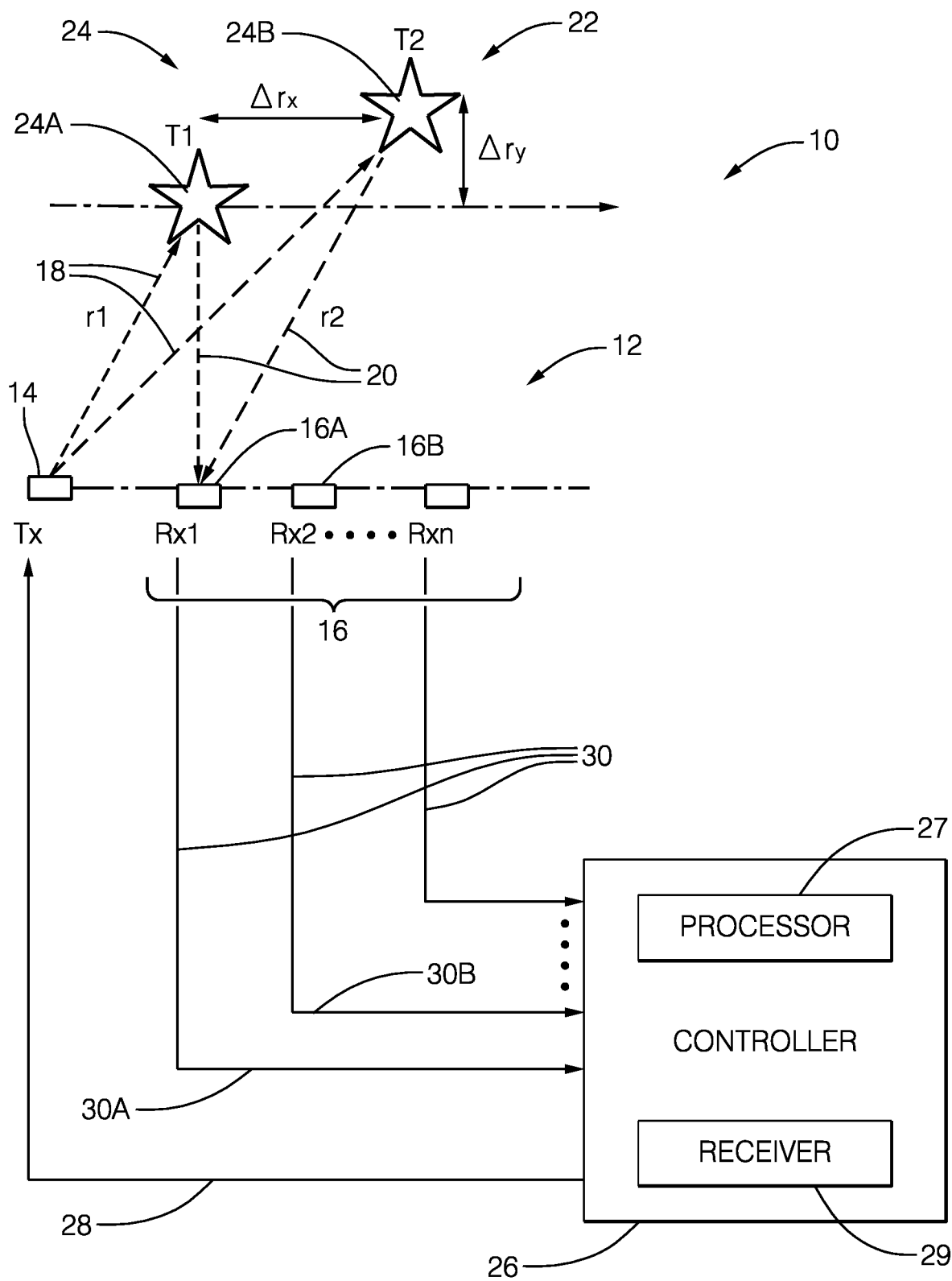
FIG. 1 illustrates a non-limiting example of a vehicle based radar system.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Automotive radar is used as a sensor for partially automated or fully autonomous operation of vehicles. Depending on angular-resolution requirements of these features, a wide-beam, or relatively narrow-beam transmit and receive antenna(s) or antenna-array(s) may be used, depending on the selected scanning concept (i.e. mechanical or electronics) across a given field-of-view. The transmit antenna radiates Radio Frequency (RF) signal that propagates toward an object in the radar field-of-view. The radio frequency signal is typically a pulse compressed waveform such as a series of waveform pulses commonly called 'chirps' or Frequency Modulated Continuous Wave, Pulse-Doppler and Frequency Shift Key. The signals reflected by the object depend on a backscatter property (i.e. Radar Cross Section) of the object. The signals reflected by the object may be received by receiving antenna-array elements, which are typically connected to single (i.e. time-multiplexed) or multiple (i.e. not time-multiplexed) signal conditioning and processing devices. Depending on the selected receiver techniques (i.e. homodyne or heterodyne), the received RF-signal is converted to discreet baseband signal during propagation through signal conditioning devices chain. For a series of waveform pulses, the baseband signal is transferred from the base time-domain to a Range-Doppler frequency domain by a digital signal processing (or DSP) device, as will be recognized by those in the art. The amplitude of Range-Doppler spectrums from all of the receive antenna-array elements are averaged (i.e. non-coherently integrated). Prior automotive radar systems use this non-coherently integrated amplitude spectral profile as the basis for an object detection schema, i.e. a NCI-detection schem3.

FIG. 1 illustrates a non-limiting example of a vehicle based radar system, hereafter referred to as the system 10. The system 10 includes an antenna array 12 that may include a transmit-element 14, and an array of receive elements, hereafter referred to as a plurality of antennas 16. It is recognized that one or more of the antenna elements that make up the antenna array 12 could be used to both transmit a radar signal 18, and output a detected signal 30 indicative of reflected radar signals 20 reflected by a first object 24A or a second object 24B in a field-of-view 22 of the system 10. The transmit-element 14 and the plurality of antennas 16 are illustrated as distinct elements in this example only to simplify the explanation of the system 10. The first and second objects (target objects) may be suitable if stationary as landmarks, and if they are single scatterers.

The system 10 may also include a controller 26 configured to output a transmit-signal 28 to the transmit-element 14, and configured to receive detected signals 30 from each antenna, for example a first signal 30A from a first antenna 16A and a second signal 30B from a second antenna 16B. Each of the detected signals 30 correspond to the reflected radar signal 20 that was detected by one of the plurality of antennas 16. The controller 26 may include a processor 27 such as a microprocessor, digital signal processor, or other control/signal conditioning circuitry such as analog and/or digital control circuitry including an application specific integrated circuit (ASIC) for processing data, as should be evident to those in the art. The controller 26 may include memory (not shown), including non-volatile memory, such as electrically erasable programmable read-only memory (EEPROM) for storing one or more routines, thresholds and captured data. The one or more routines may be executed by the processor 27 to perform steps for determining if the detected signals 30 received by the controller 26 indicate the presence of the first object 24A and/or the second object 24B, as described herein.

To meet customer specified angular-resolution requirements of automotive radar systems, such systems often use antennas that have relatively narrow transmit and receive beam-widths to scan a field-of-view for objects. In this non-limiting example, the transmit-element 14 radiates or emits the radar signal 18 toward the first object 24A and/or the second object 24B in a field-of-view 22, and each of the plurality of antennas 16 detects a reflected radar signal reflected by the first object 24A and/or the second object 24B in the field-of-view 22 of the system 10.

Characteristics of the reflected radar signal 20 depend on a backscatter property or radar cross section (RCS) of the first object 24A or the second object 24B. Depending on the signal waveform and the modulation system used, the controller 26 may transform the time domain signals (the detected signals 30) to the frequency domain so, for example, the spectrums can be combined using, for example, non-coherent integration (NCI). Some automotive radar systems use this non-coherently integrated spectral data as the basis for object detection, and evaluate the spectral data to determine the position and Doppler parameter estimates that have higher spectral magnitude than a defined detection threshold. NCI is generally preferred to suppress noise induced variation and thereby keep noise induced false alarm rates to a minimum.

The problem of determination if a radar backscatter return originates from a single scattering center (of a target object) is solved using an efficient method of a 2-D amplitude spectral evaluation (in the range-Doppler domain) where information from multiple receiver (RX) channels is processed. The methodology may for example utilize the system as described above.

In the proposed method, N 2-D range-Doppler maps from N RX channels are analyzed. Typically, the data is arranged in terms of a set of frequency ranges—so called Doppler "bins". As it is a matter of interference between signals reflected from scattering centers located in relative close proximity to each other in space, amplitude spectral information from the (2-D) measured complex data (in the range-Doppler domain) are evaluated at the position of the resulting "peak" with respect to each RX channel to determine if the measured response originates from a single scattering center or not.

Typically, antenna systems used on vehicles comprise a plurality of antennas/receiving elements arranged as an antenna array. This allows beam forming. Different scatterers produce different range-Doppler responses (maps) across the plurality of those N RX channels.

In a method according to the invention, the position of the maximum of the amplitude (or power) spectrum for the available N RX channels of the radar module is estimated/interpolated and the variation among these N estimates in respect of the N RX channels is analyzed.

If the peak maximum does not occur at the same position (in the range-Doppler map) for those N estimates (taking into account an uncertainty of the estimates), then the target is considered to be a non-single scatterer.

In the case of a single scatterer, the peak maximum would be namely at the same position (in the range-Doppler map, taking some uncertainty into account) for those N RX channels.

Figure 2:
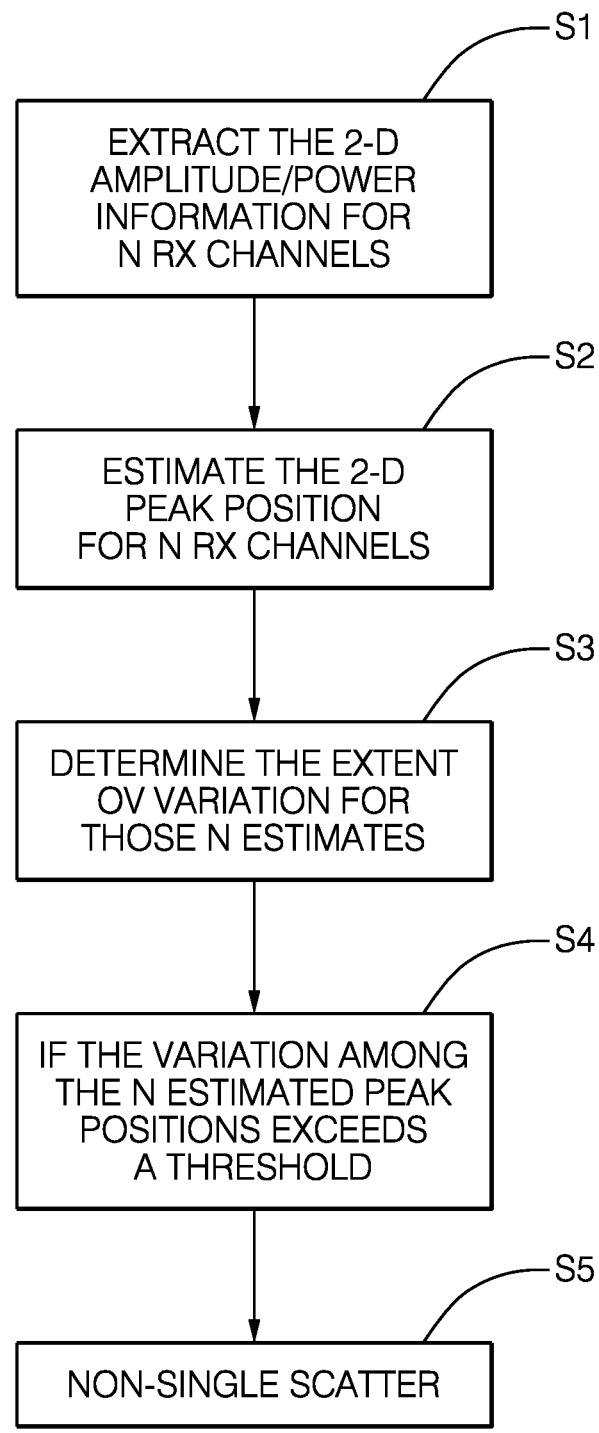
FIG. 2 shows a flowchart of basic methodology according to one example.

In one example, the following methodology is implemented, with reference to FIG. 2.

A radar system comprising an antenna receive array having multiple (N) receive (RX) channels sends out a radar signal and so the received reflected signal form a target is received by N receiver channels and processed. The subsequent processing i.e. analysis is described with reference to flowchart of FIG. 2.

In step S1, from the signals received by the antenna array, amplitude and/or power spectral information, from the N available range-Doppler maps is extracted (for each of the N RX channels);

S2 is the step of determining the position of the maximum (peak) amplitude (or power) spectrum for those N RX channels (N estimates); this may be done by suitable interpolation; so the 2D peak position is determined. The process will therefore determine the frequency (or frequency bin) which has the max (peak) amplitude, in respect of each N RX channel.

In step S3, the extent of the variation of the position (in terms of frequency/frequency bin) in the range Doppler map amongst the N RX channels data is determined.

In subsequent steps S4 and S5 the degree of variation of frequency /frequency bin which correlate to maximum/peak power is determined and the test for a single scatterer is based on the degree of variation—the less variation the more the target is considered a single scatterer.

So for example in step S4 the extent to which the target is a single scatterer based on these results from step S3. Specifically, in this example, for example if the variation among the N estimated peak positions is above a threshold then the target object is considered to be a non-single scatterer.

In FIG. 2, a flowchart of the algorithmic processing steps described above is presented.

Without loss of generality, for a better visualization of the problem being solved by the proposed method, a shift/mismatch between the target responses (PSFs) along the Doppler dimension is not considered here. However, the proposed method can be applied on 1-D as well as on 2-D (like the range-Doppler map) spectral data.

Figure 3:
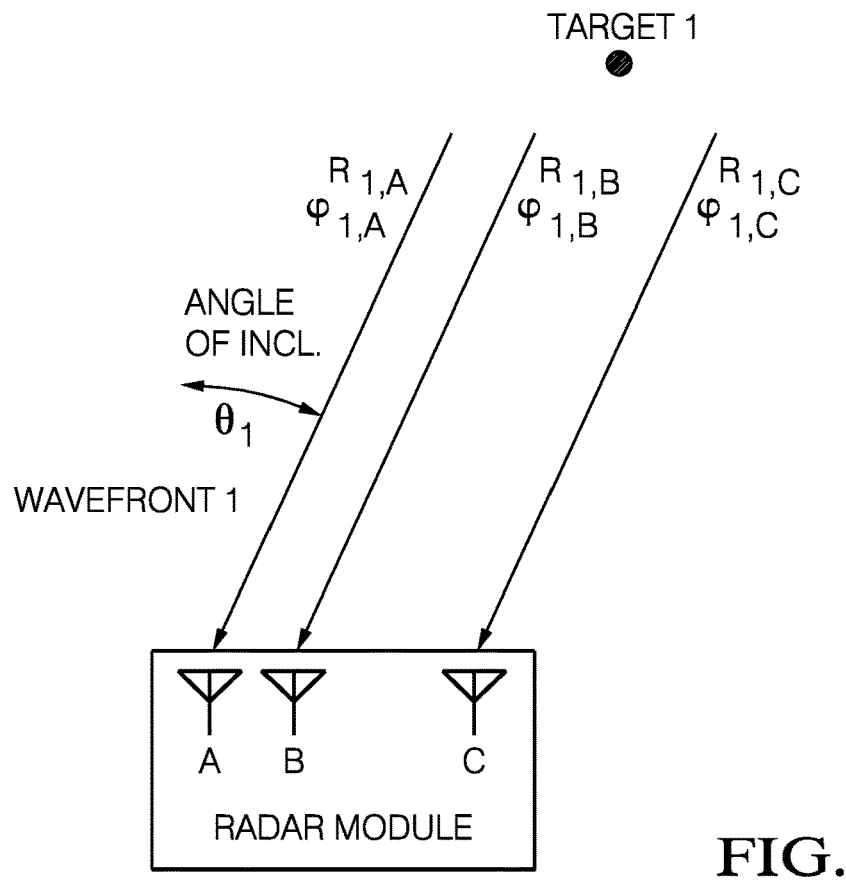
FIG. 3 shows a schematic representation of a single scattering target and a radar system.
Figure 6:
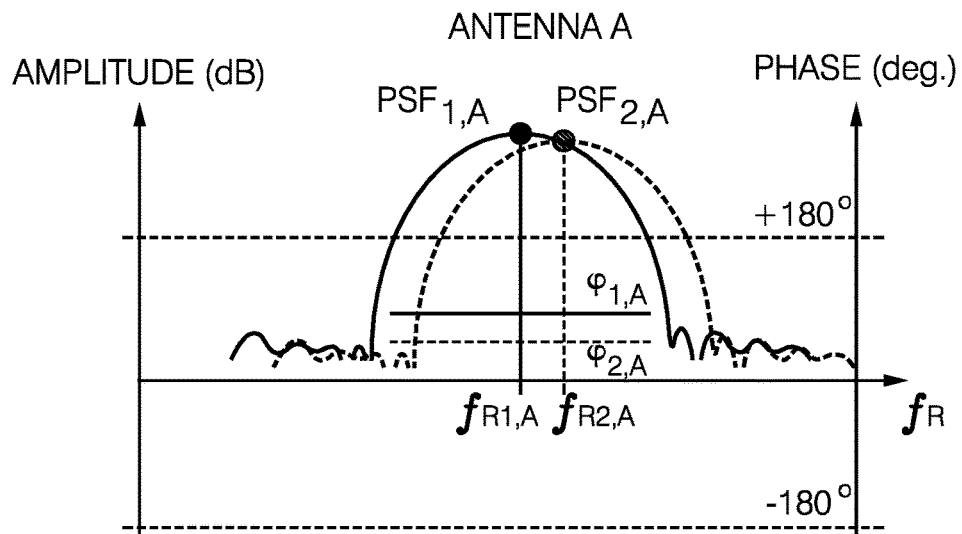
FIGS. 6a, 6b, 6c, are also shown corresponding PSF for target in each of three antenna receive elements (channels)
Figure 6:
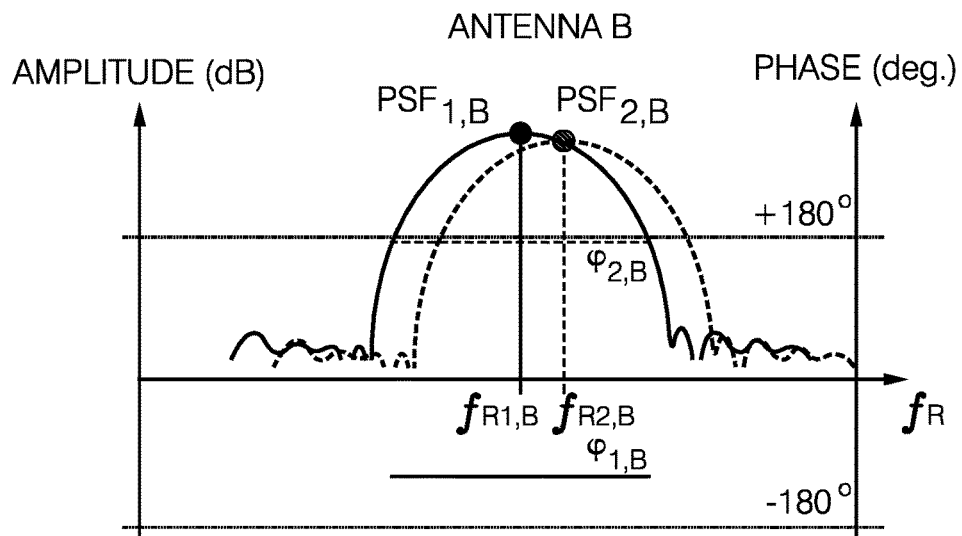
Figure 6:
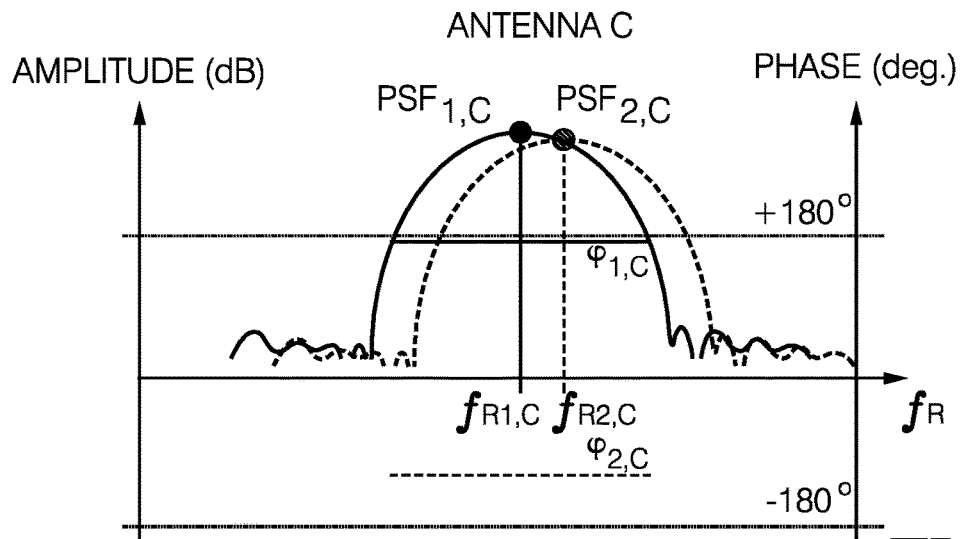

Consider the situation where a single scattering center (Target 1) is present in the sensed scene (see FIG. 3). There are three receiver elements (channels) designated A, B and C in radar module 100. When the angle of incidence is $\theta_1$, and the resulting range frequency is $f_R \propto R$, then $R_{1,A} \approx R_{1,B} \approx R_{1,C} \rightarrow f_{R1,A} \approx f_{R1,B} \approx f_{R1,C}$. Thus, the corresponding PSF1 in respect of Target 1 (for the antennas A, B, C are designated PSF1,A , PSF1,B , PSF1,C) are shown in FIGS. 6a, 6b and 6c positioned at almost the same range frequency $f_{R1,n}$ for the N RX channels (here exemplarily called antenna receive elements A, B, and C). Nevertheless, $R_{1,A} \neq R_{1,B} \neq$ $R_{1,C} \to \varphi_{R1,A} \neq \varphi_{R1,B} \neq \varphi_{R1,C}$. Therefore, generally the phases of the corresponding PSFs are different for the N RX channels.

Figure 4:
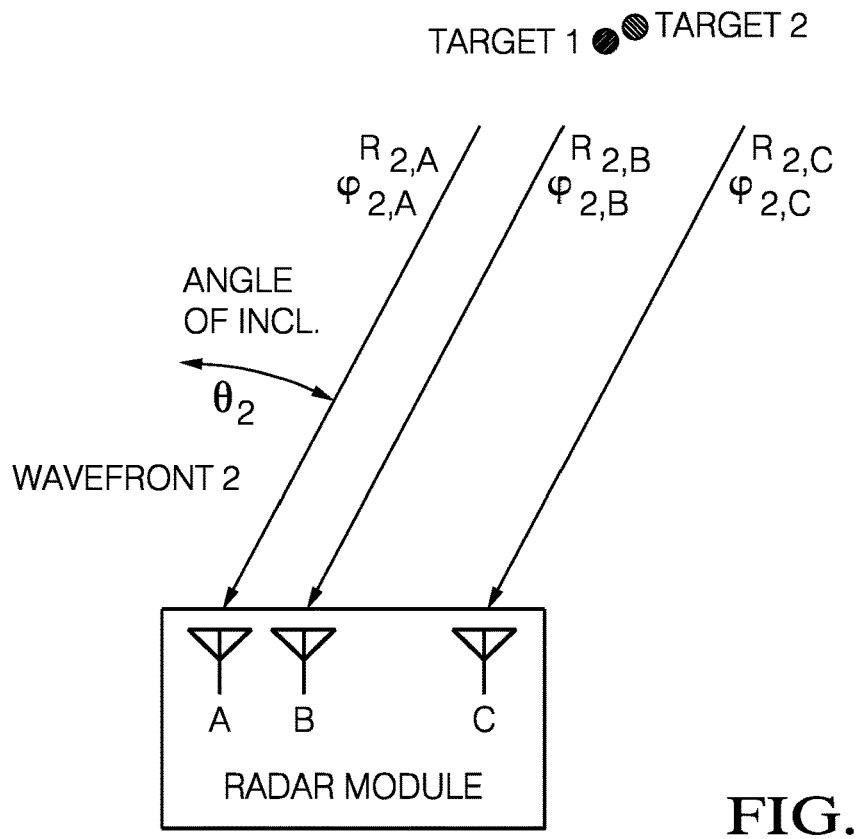
FIG. 4 shows a schematic representation similar to FIG. 3 where a second scattering center is placed in a close proximity.
Figure 5:
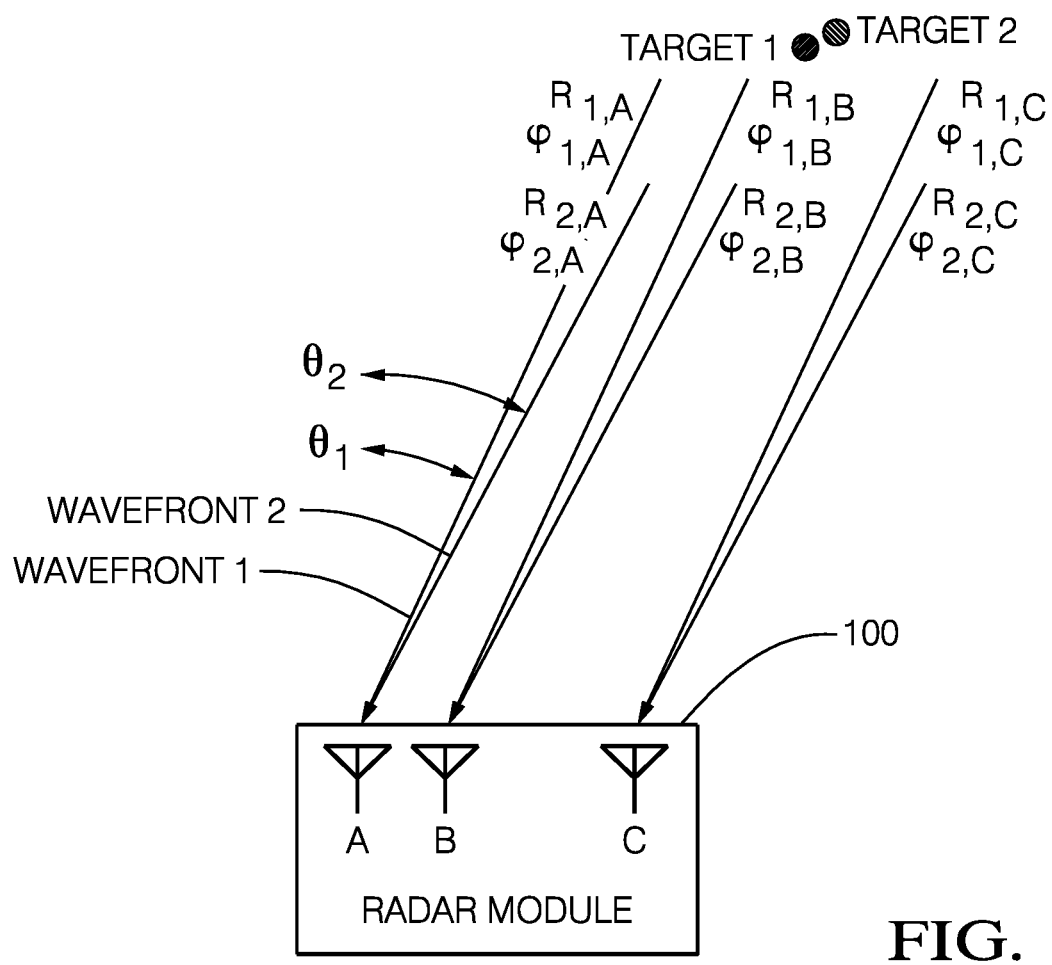
FIG. 5 illustrates the wave front with respect to the two scattering centers of FIG. 4.

Consider a situation where a second scattering center (named Target 2) is placed in a close proximity to Target 1 in space. This is shown in FIG. 4 and the wave front with respect to the two scattering centers are shown in comparison in FIG. 5.

In FIG. 6a, 6b, 6c, are also shown corresponding PSF for target to in each of three antenna receive elements (channels) respectively designated PSF2,A, PSF2,B, PSF2,C. Then, at the N available RX channels, a superposition of those two scattered signals occurs (see FIG. 7). When its angle of incidence is $\theta_2$ and $R_{2,n} \neq R_{1,n}$ then $f_{R2,n} \neq f_{R1,n}$ and $\varphi_{R2,n} \neq \varphi_{R1,n}$.

So FIGS. 6a, 6b, and 6c shows the two targets and the corresponding backscatter signals together. If $|R_{2,n} - R_{1,n}|$<range resolution limit, then the two targets cannot be resolved in the spectral domain. Thus, due to the overlapping/superposition of the PSF 1 and PSF 2 a non-single scatterer response is observed on each RX channel.

A case was simulated where two PSFs with a frequency distance of 1.0 range bin are put in a close proximity to each other along the range frequency dimension. The targets are considered to be stationary here (without loss of generality). The first PSF (PSF1) has amplitude of 1.0, and the second one (PSF2) has amplitude of 0.9.

Figure 7:
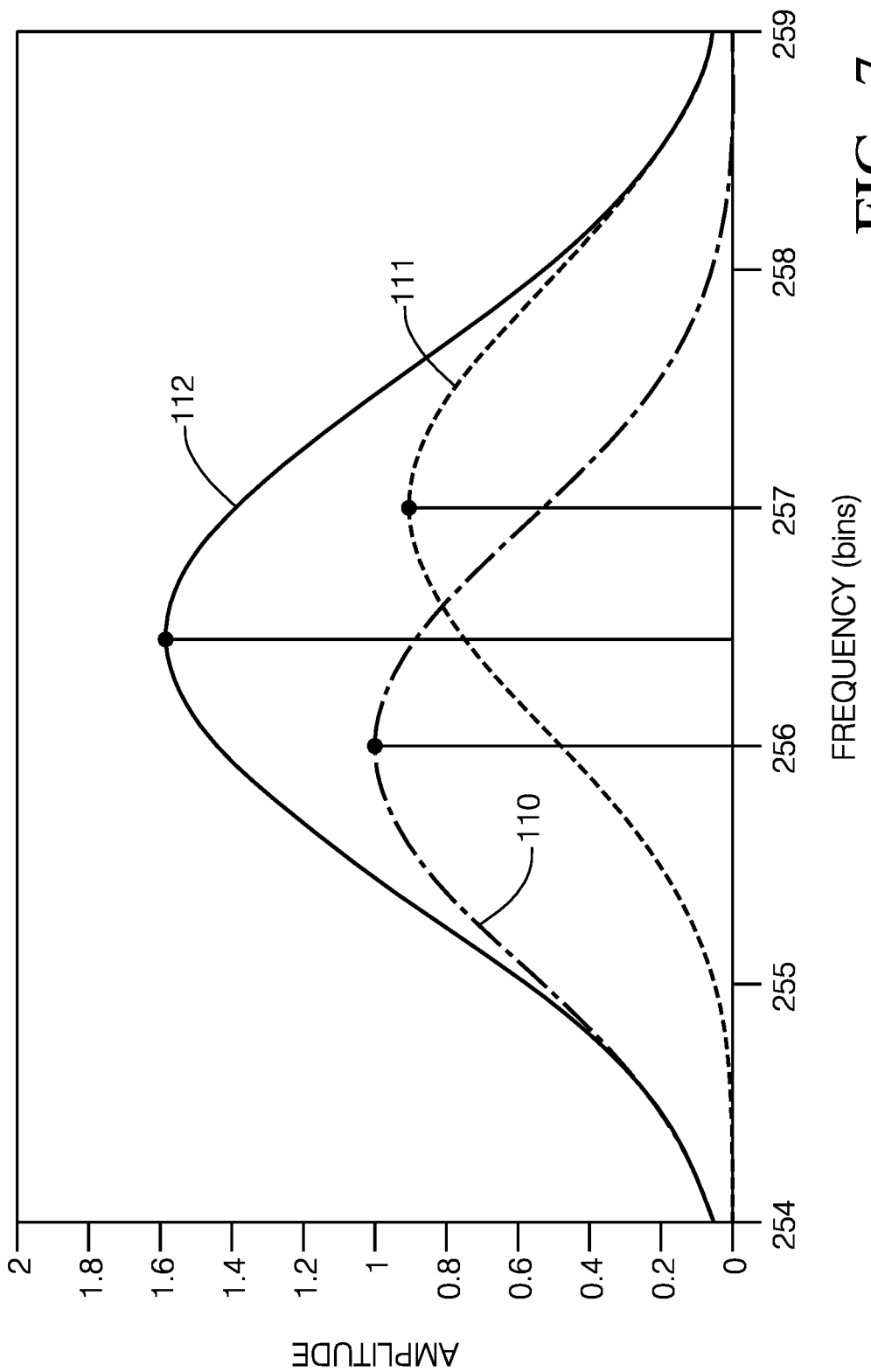
FIGS. 7, 8, and 9 show simulated amplitude spectrum (amplitude vs. frequency bins shown as a 1-D cut through a 2-D frequency map) for 3 RX channels.
Figure 8:
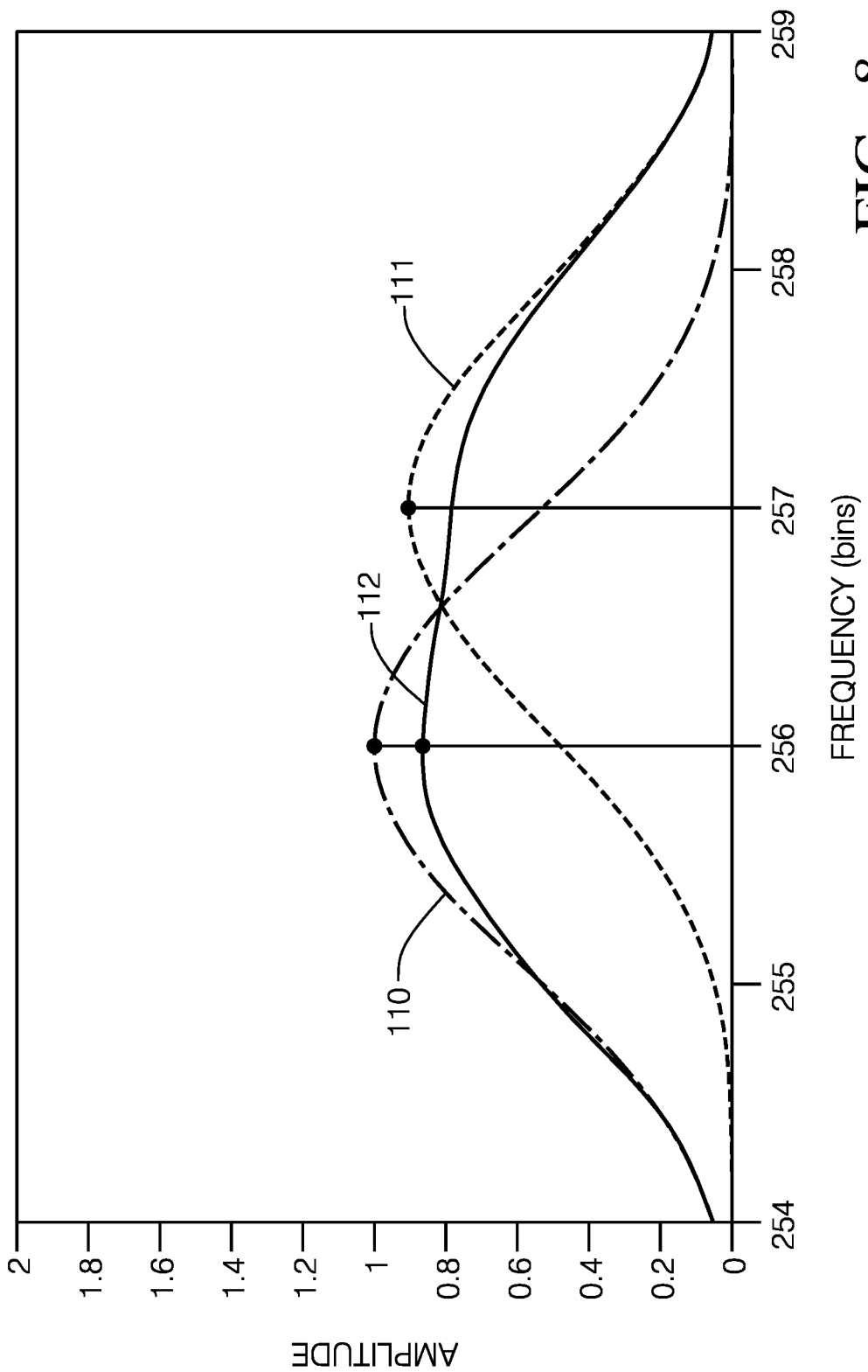
Figure 9:
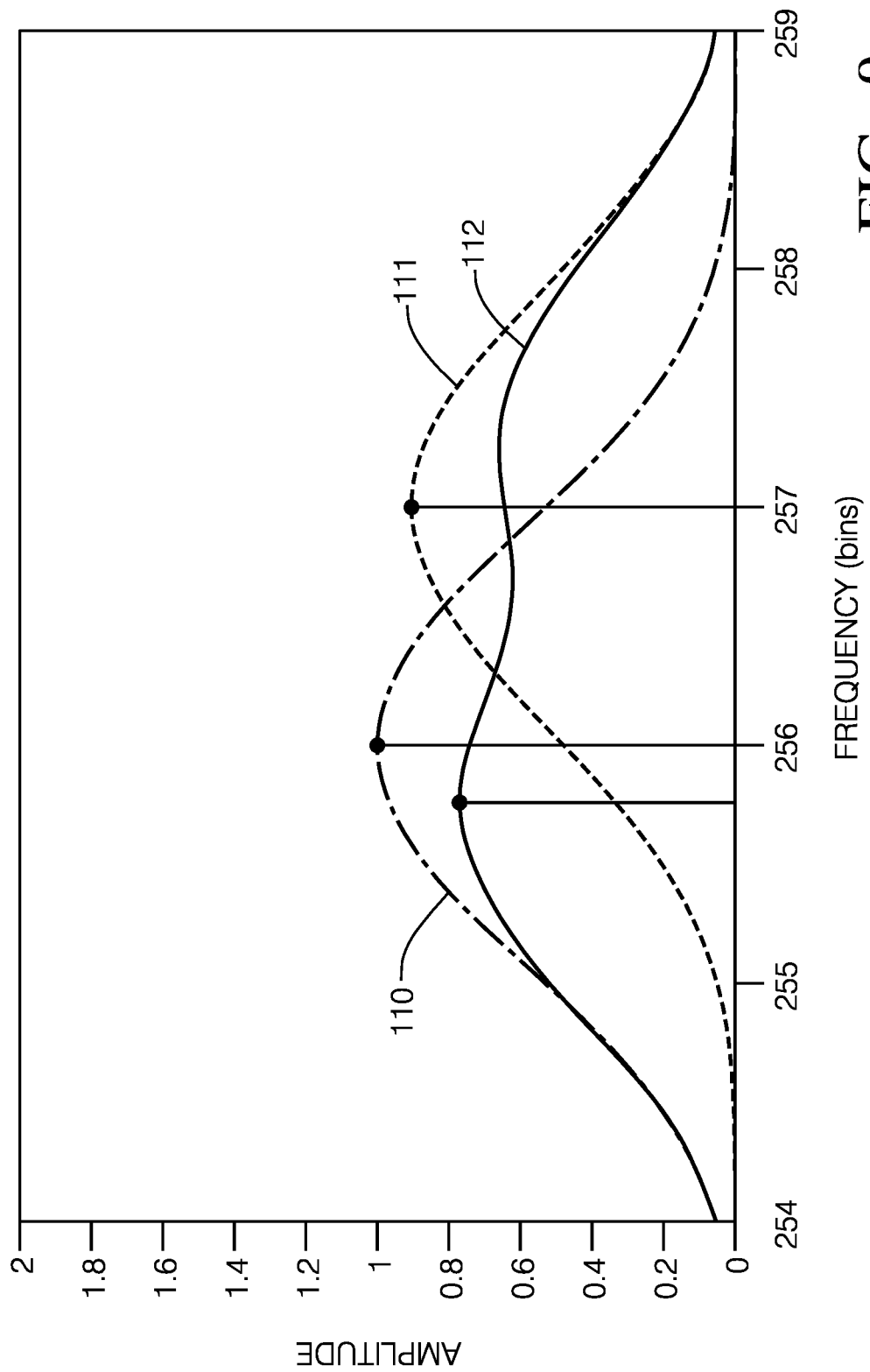

In FIGS. 7, 8, and 9 simulated amplitude spectrum (amplitude vs. frequency bins shown as a 1-D cut through a 2-D frequency map) are given for 3 RX channels. The phases of the individual PSFs have been arbitrarily chosen. As can be seen, the estimated position of the amplitude peaks for the 3 RX channels are not at the same frequency position. Thus, the peak under test is determined to originate from a non-single scatterer.

Reference numeral 110 shows the PSF for Target 1 and 111 shows the PSF for Target 2. For FIG. 7 Target 1 the peak amplitude is at frequency bin 256 and for Target 2 this is at frequency bin 257. Reference numeral 112 shows the superposition of the two PSFs that is from the actual data of the received signal.

FIG. 7 shows the results/data for a 1st RX channel (Antenna A) with a 1st PSF: Frequency bin=256.0, Amplitude=1.0, Phi=0 deg. 2nd PSF: Frequency bin=257.0, Amplitude=0.9, Phi=30 deg. Position of the amplitude peak after the superposition: Frequency bin=256.5.

FIG. 8 shows the data for a 2nd RX channel (Antenna B) 1st PSF: Frequency bin=256.0, Amplitude=1.0, Phi=0 deg. 2nd PSF: Frequency bin=257.0, Amplitude=0.9, Phi=120 deg. Position of the amplitude peak after the superposition: Frequency bin=256.0.

FIG. 9 shows the data for a 3rd RX channel (Antenna C) 1st PSF: Frequency bin=256.0, Amplitude=1.0, Phi=0 deg. 2nd PSF: Frequency bin=257.0, Amplitude=0.9, Phi=135 deg. Position of the amplitude peak after the superposition: Frequency bin=255.8.

The technique gives a number of advantages: no phase needs to be calculated, and no symmetry needs to be considered. The method is sensitive, very robust, and has a low computational cost.

We claim:

1. A vehicle-based method of determining if a radar backscatterer return of a target object originates from a single scattering center, said vehicle including a radar system including a radar transmit element, adapted to send a radar signal towards said target object, and an antenna receive array comprising a plurality M of a receive elements, providing a corresponding plurality of N radar receive channels, and adapted to receive radar signals reflected from said target object, said method comprising:
   a) transmitting a radar signal from said radar transmit element to said target object;
   b) receiving the reflected signal of the signal transmitted in step a) from the target object at said plurality of receiver elements;
   c) for each antenna element or channel, processing the received signal to provide amplitude or power data in the frequency domain;
   d) with respect to the data in step c), for each receive element/channel, determining the frequency with the maximum amplitude or power;
   e) determining the degree of variability of the results of step d) with respect to each receive element/channel;
   f) determining if the degree of variability from step e) is above or below a threshold, and determining either that the target object is a single scatterer if the degree of variability is below said threshold or that the target object is a non-single scatterer if the variation is above said threshold.

2. A method as claimed in claim 1, wherein step c) includes for each antenna receive channel, processing the data to provide power or amplitude data in relation to frequency bins comprising discrete frequency ranges, and step d) comprises for each antenna/channel, determining the bin with the maximum amplitude or power; and step e) determines the degree of variability in said bins in respect of each for each receive element/channel.

3. A method as claimed in claim 2, wherein step c) includes providing power or amplitude data in term of Doppler bins comprising a set of frequency ranges.

4. A method as claimed in claim 1, wherein in step c) received signal data is converted from the base time-domain to a range-Doppler frequency domain.

5. A method as claimed in claim 1, wherein step c) includes providing a range-Doppler map in terms of range-Doppler frequency domain for each receive element/channel.

6. A method as claimed in claim 1, wherein in step c) the power or amplitude data is determined from amplitude spectral information from 1-D or 2-D data in the range Doppler, frequency, domain.

* * * * *